US008767844B2

(12) United States Patent
Alexander et al.

(10) Patent No.: US 8,767,844 B2
(45) Date of Patent: Jul. 1, 2014

(54) METHOD AND APPARATUS FOR MULTICARRIER COMMUNICATIONS

(75) Inventors: Paul Dean Alexander, Prospect (AU); Alexander James Grant, North Adelaide (AU); David Victor Lawrie Haley, Stepney (AU)

(73) Assignee: Cohda Wireless Pty. Ltd. (AU)

( * ) Notice: Subject to any disclaimer, the term of this patent is extended or adjusted under 35 U.S.C. 154(b) by 954 days.

(21) Appl. No.: 12/302,134

(22) PCT Filed: May 24, 2007

(86) PCT No.: PCT/AU2007/000722
§ 371 (c)(1),
(2), (4) Date: Jun. 4, 2009

(87) PCT Pub. No.: WO2007/134406
PCT Pub. Date: Nov. 29, 2007

(65) Prior Publication Data
US 2009/0296845 A1    Dec. 3, 2009

(30) Foreign Application Priority Data

May 24, 2006   (AU) ................................. 2006902812

(51) Int. Cl.
*H04L 27/28* (2006.01)
(52) U.S. Cl.
USPC ........... 375/260; 375/259; 375/316; 375/219; 375/324; 375/267; 375/349
(58) Field of Classification Search
USPC .......... 375/260, 259, 316, 219, 324, 267, 349
See application file for complete search history.

(56) References Cited

U.S. PATENT DOCUMENTS 7,027,517 B1 *   4/2006   Nagai et al. .............. 375/240.28
7,027,519 B2 *   4/2006   Bao et al. ...................... 375/260

(Continued)

FOREIGN PATENT DOCUMENTS

| WO | WO-2004/042982 A2 | 5/2004 |
| WO | WO-2005/119953 A1 | 12/2005 |
| WO | WO-2007/095697 A1 | 8/2007 |

OTHER PUBLICATIONS

"International Application Serial No. PCT/AU2007/000722, International Preliminary Report on Patentability mailed on Dec. 11, 2008", 9 pgs.

(Continued)

*Primary Examiner* — Kenneth Lam
(74) *Attorney, Agent, or Firm* — Schwegman Lundberg & Woessner, P.A.

(57) ABSTRACT

A data processing device (100, 300) is described forming part of a receiver for a multicarrier communications system. The data processing device is configured to process at least one observed symbol to generate an information bit estimate for the symbol, and includes a channel prediction stage configured to receive an observed symbol and at least one feedback signal representing an estimate of a transmitted symbol and to generate a channel prediction. At least one initial processing stream (104) is configured to process the observed symbol on the basis of a channel prediction calculated at a respective time by the channel prediction stage and to output a signal representing an estimate of a transmitted symbol corresponding to the observed symbol for feed back into the channel prediction stage. A subsequent processing stream (102) is configured to process the observed symbol on the basis of a channel prediction calculated at a second time by the channel prediction stage at least partly on the basis of an output of at least one initial processing stream in respect of the observed symbol, to generate an information bit estimate corresponding to the observed symbol.

39 Claims, 3 Drawing Sheets

(56) References Cited

U.S. PATENT DOCUMENTS

| | | | |
|---|---|---|---|
| 2003/0174686 A1* | 9/2003 | Willenegger et al. | 370/342 |
| 2003/0232601 A1* | 12/2003 | Uno | 455/67.11 |
| 2004/0071193 A1* | 4/2004 | Atarashi et al. | 375/144 |
| 2004/0156453 A1 | 8/2004 | Yuan-Wu et al. | |
| 2005/0176436 A1* | 8/2005 | Mantravadi et al. | 455/450 |
| 2006/0280114 A1* | 12/2006 | Osseiran et al. | 370/208 |
| 2007/0036179 A1* | 2/2007 | Palanki et al. | 370/491 |

OTHER PUBLICATIONS

"International Application Serial No. PCT/AU2007/000722, International Search Report mailed on Jun. 27, 2007", 3 pgs.

"International Application Serial No. PCT/AU2007/000722, Written Opinion mailed Jun. 27, 2007", 7 pgs.

* cited by examiner

METHOD AND APPARATUS FOR MULTICARRIER COMMUNICATIONS

RELATED APPLICATIONS

This application is a national stage application under 35 U.S.C. 371 of PCT/AU2007/000722, filed May 24, 2007, and published as WO 2007/134406 A1, on Nov. 29, 2007, which claims priority under 35 U.S.C. 119 to Australian Application No. 2006902812, filed May 24, 2006, which applications and publication are incorporated herein by reference and made a part hereof in their entirety.

FIELD OF THE INVENTION

The present invention relates to the field of wireless communications. In particular, the present invention relates to improved multicarrier communications. It will be convenient to hereinafter describe the invention in relation to systems and methods incorporating an IEEE 802.11 OFDM physical channel, although embodiments of the present invention may find application in systems operating in accordance with other standards, or in proprietary OFDM systems, and the present invention should not be limited to that exemplary use.

BACKGROUND OF THE INVENTION

There is an increasing market demand in customer segments like Public Safety and Homeland Security for outdoor, metropolitan-area broadband networks supporting vehicular mobility. The ubiquity, availability and low cost of 802.11-based devices are clear motivations for the use of 802.11 in such scenarios. However, the IEEE 802.11 OFDM physical layer was designed primarily for indoor wireless local area networks. Typically, 802.11 radios suffer greatly reduced performance or may fail completely when deployed in scenarios for which they were not intended such as outdoor, non-line-of-sight scenarios. Vehicular speed mobility further adds to difficulties applying 802.11 systems for outdoor use.

There are two main physical layer impediments for the application of 802.11 OFDM in outdoor mobile scenarios. The first impediment is that longer multipath delay spreads are typically encountered in outdoor channels. This causes self-interference via inter-symbol interference (ISI) and inter-carrier interference (ICI). The longer delay spread also increases the frequency selectivity of the channel, which causes difficulties with channel estimation. The second impediment is due to mobility, which adds the further complication that the multipath propagation effects are time-varying and may change appreciably within the duration of a single OFDM packet. Each of these effects can be present independently and are individually challenging. When present simultaneously, they pose significant difficulties for receiver design.

Our previous PCT application PCT/AU2007/000231, claiming priority from Australian provisional patent application no 2006900984, filed 27 Feb. 2006 and titled "Method and System for Communication in a wireless network", the contents of which are incorporated herein by reference, discloses systems and methods for addressing at least one of the drawbacks of the prior art. The preferred embodiments described herein provide an alternative to the systems and methods disclosed in that specification.

SUMMARY OF THE INVENTION

In one aspect the present invention provides a data processing device forming part of a receiver for a multicarrier communications system, said data processing device being configured to process a plurality of observed symbols to generate a receiver output, the data processing device including: a channel prediction stage configured to receive an observed symbol and a feedback signal representing an estimate of at least one transmitted symbol in respect of at least one previously processed data symbol and to generate a channel prediction; an initial processing stream configured to process the observed symbol on the basis of a channel prediction calculated at a first time by the channel prediction stage and to output a signal representing an estimate of a transmitted symbol in respect of the observed symbol for feed back into the channel prediction stage; and a subsequent processing stream configured to process the observed symbol on the basis of a channel prediction calculated at a second time by the channel prediction stage at least partly on the basis of an output of the initial processing stream in respect of the observed symbol, to generate an information bit estimate for the observed symbol.

Preferably the channel prediction stage can include a time domain channel estimator. The channel prediction stage can include a frequency domain channel predictor. The data processing device may further include at least one domain converter to convert at least one of an input and/or output of the channel estimator between the time and frequency domains.

The initial processing stream can include a remodulator configured to remodulate an initial information bit estimate corresponding to an observed symbol for use as a feedback signal.

The data processing device can further include an interference cancellation stage in the subsequent processing stream.

In a further aspect the present invention provides data processing device forming part of a receiver for a multicarrier communications system, said data processing device being configured to process at least one observed symbol to generate an information bit estimate for the symbol, the data processing device including: a channel prediction stage configured to receive an observed symbol and at least one feedback signal representing an estimate of a transmitted symbol and to generate a channel prediction; at least one initial processing stream configured to process the observed symbol on the basis of a channel prediction calculated at a respective time by the channel prediction stage and to output a signal representing an estimate of a transmitted symbol corresponding to the observed symbol for feed back into the channel prediction stage; and a subsequent processing stream configured to process the observed symbol on the basis of a channel prediction calculated at a second time by the channel prediction stage at least partly on the basis of an output of at least one initial processing stream in respect of the observed symbol, to generate an information bit estimate corresponding to the observed symbol.

The data processing device may include a plurality of initial processing streams.

A plurality of initial processing streams can be configured to successively process the observed symbol on the basis of a channel prediction calculated at a different respective time.

Preferably the second time is delayed with respect to the respective time corresponding to each initial processing stream. The respective time corresponding to at least one initial processing stream can be dynamically allocated.

In some embodiments the data processing device includes a plurality of initial processing streams, and the device is further configured to selectively bypass at least one processing stream.

The device can further include a multiplexer to multiplex an output signal representing an estimate of a transmitted symbol in respect of the observed symbol from a plurality of processing streams.

In some embodiments the subsequent processing stream can be further configured to output a signal representing an estimate of a transmitted symbol in respect of the observed symbol for feed back into the channel prediction stage.

The channel prediction stage can be configured to receive a plurality of feedback signals each representing an estimate of the transmitted symbol in respect of the same data symbol. In this case the plurality of feedback signals input into the channel prediction stage may be multiplexed.

In another aspect the present invention provides a receiver for a multicarrier communications system including a processing device made in accordance with the third or forth aspect of the invention.

In a further aspect the present invention provides a method of channel prediction, in a receiver for a multicarrier communications system, including: generating a time domain channel estimate from at least a portion of an observed signal; converting the time domain channel estimate to a frequency domain channel estimate; and generating one or more channel predictions using the frequency domain channel estimate.

The method can additionally include, feeding back at least one transmitted symbol estimate for use in the channel estimation; wherein each transmitted symbol estimate is derived on the basis of a previously derived channel prediction. In this case the method can additionally include, converting a transmitted symbol estimate for use in the channel estimation into a time domain estimate.

In another aspect there is provided a method of processing at least one observed symbol in a receiver for a multicarrier communications system, the method including: (a) processing an observed symbol to generate a channel prediction; (b) processing the observed symbol to generate at least one initial transmitted symbol estimate in respect of the observed symbol; (c) generating an updated channel prediction at least partially on the basis one or more initial transmitted symbol estimates in respect of the observed symbol; (d) processing the observed symbol on the basis of the updated channel prediction to generate an information bit estimate.

In some embodiments at least one of steps (a) and (c) can include the step of: (e) generating a time domain channel estimate from the observed symbol.

It is preferable that at least steps (b) and (d) are performed in the frequency domain.

Step (d) can further include:

(f) performing error correction processing on the first observed symbol.

In an embodiment of the above methods step (b) can include, (g) decoding the observed data to form an initial information bit estimate; and (h) remodulating the initial information bit estimate to generate a transmitted symbol estimate.

The method can further include the step of, using the transmitted symbol estimates in at least one of steps (c) or (f).

Preferably at least one of steps (a) and (c) are performed in accordance with an embodiment of the first aspect of the present invention.

In certain embodiments the step (a) of the method can include: using a sliding correlator to generate a channel estimate in respect of an observed symbol.

The method can further include transmitting at least one parameter of a sliding correlator for use in generation of a channel estimate in respect of a data symbol.

The method can include, generating a first channel prediction on the basis of received channel estimate. In this case the received channel estimate can be derived from at least one of: a channel estimate relating to a previously received data symbol; or a channel estimate relating to a previously received data packet.

In a further aspect the present invention provides a set of processing instructions configured to be run by a processing device to implement any of the methods according to an aspect of the present invention, and/or a memory storing said set of processing instructions.

BRIEF DESCRIPTION OF THE DRAWINGS

Embodiments of the present invention will be described by way of non-limiting example only with reference to the accompanying drawings, in which.

DETAILED DESCRIPTION OF THE EMBODIMENTS

Figure 1:
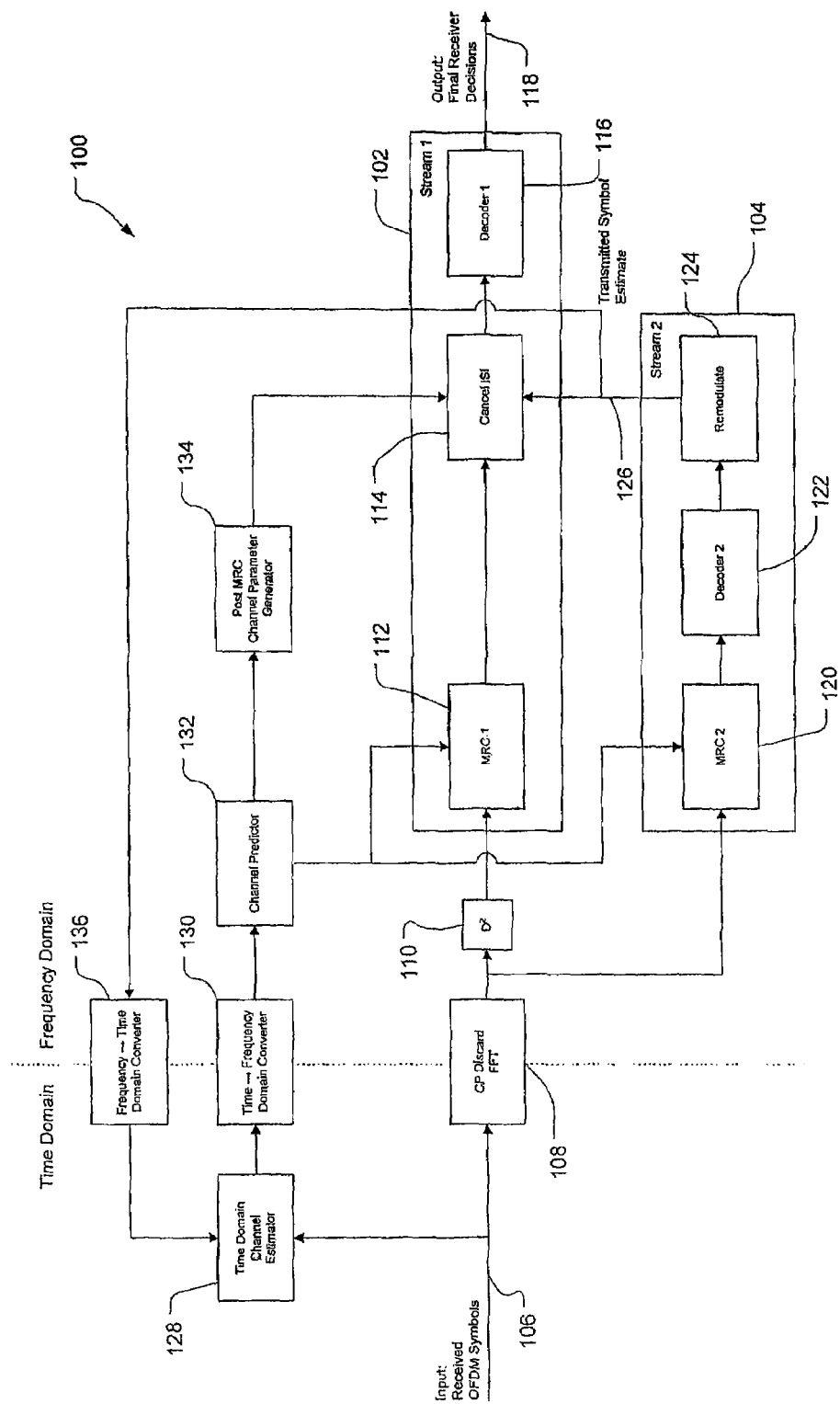
FIG. 1 is a schematic illustration of a receiver operating in accordance with an embodiment of the present invention.

FIG. 1 illustrates the main processing blocks in a receiver operating in accordance with a first embodiment of the present invention. The processing blocks may be implemented as software running on a receiver device that may include one or more microprocessors. Alternatively, the processing blocks may be implemented as customised hardware provided in a receiver device, for example using one or more Digital Signal Processors (DSPs), Field Programmable Gate Arrays (FPGAs) or Application Specific Integrated Circuits (ASICs).

The present inventors have identified that channel estimation is most accurately performed in the time domain, because the number of parameters specifying the channel in the time domain is minimal. Consider for example, a single tap channel. In the time domain this is a single amplitude and phase, while in the frequency domain it is 64 amplitudes and phases. The phases and amplitudes of the 64 sub-carriers are all related in the frequency domain, but correctly building this relationship into a frequency-domain channel estimator amounts to operating in the time domain.

With this in mind, the receiver 100 of FIG. 1 uses data-aided time-domain channel estimation and tracking, and frequency domain equalization. Interference is mitigated using a two-tap frequency-domain decision feedback equalizer to remove Inter Symbol Interference (ISI). For typical channel models the ISI components may be more powerful than the Inter Carrier Interference (ICI) components and are therefore preferentially treated in this embodiment of the present invention.

In the example of FIG. 1, processing is performed per OFDM symbol, as opposed to per packet, in order to reduce latency. Generally speaking in the receiver 100 of FIG. 1 there are two parallel data processing streams. Stream 1, 102 produces the final receiver decisions i.e. an information bit estimate corresponding to an observed data symbol and operates at a delay with respect to stream 2 104, which assists with interference cancellation and channel estimation, by providing "early" decoder outcomes for training. In the present embodiment a two OFDM symbol delay is used between processing of a symbol in the second 104 and first 102 streams, however longer delays may be used in other embodiments. Moreover the length of the delay can be set dynamically on the basis of one or more system state parameters.

Processing of the observed OFDM symbols received at 106 begins with cyclic prefix removal and conversion to the frequency domain in CP discard and FFT block 108. As noted above stream 1, 102, operates with a 2 symbol delay with respect to stream 2 104 and hence the necessary delay as introduced by delay block 110.

Processing in Stream 1, 102 begins at MRC block 112 which performs per-subcarrier two-tap maximal ratio combining. This has the benefit of collecting all of the energy relating to the symbol of interest. Inter-symbol interference is cancelled in block 114 from this combined output, using the re-modulated decoder outcomes of stream 2, 104. Inter-Carrier Interference cancellation modules may also be added at this stage if desired. The interference canceller 114 operates on the post-MRC signals, and therefore the channel parameters that it requires are as seen post-MRC. These parameters are provided by the Post MRC Channel parameter generator 134. The interference cancelled signal is then decoded in decoder 116, producing the information bit estimates corresponding to the observed data symbol, which are output at 118.

The primary role of stream 2 104 is to generate interference estimates for use in stream 1, 102, and in channel estimation. Stream 2, 104 includes a maximum ratio combiner 120 driving a second decoder 122 to calculate initial information bit estimates which are remodulated in block 124 to generate transmitted symbol estimates 126.

Note that the two separate MRC blocks are not only desirable from a pipelining/lower latency point of view, but they also use different channel estimates. Because stream 1, 102, is performing processing 2 symbol periods later than stream 2, 104, stream 1, 102 benefits from the most recently updated and more accurate channel estimates.

Apart from the two main processing streams 102, 104 further processing occurs in determining channel parameters. The channel parameter processing begins in the time domain, where an initial channel estimate is computed in block 128. Each transmitted OFDM Packet will typically consist of one or more preamble symbols, which are known to both the transmitter and receiver, followed by a sequence of data bearing OFDM symbols. The initial channel estimate is preferably based on the received time-domain signal 106 and the known packet preamble. Alternatively, the initial channel estimate may be provided as an input, thus bypassing block 128. Such an initial estimate may, for example, be derived from the channel estimate relating to a previously received packet. The channel estimate is subsequently updated each OFDM symbol period, in a data-directed manner, using data output at 126 which includes re-modulated versions of initial information bit estimates output by decoder 122 of stream 2, 104. The resulting channel parameters are converted to the frequency domain by block 130, and are used for driving a frequency-domain channel predictor 132. This predictor 132 provides channel estimates for the next two (as yet un-decoded by stream 1, 102) OFDM symbols. It operates per-subcarrier and maintains sufficient internal state to provide accurate predictions.

Quantities such as the residual frequency offset may be employed by the channel predictor 132. The residual frequency offset may be computed as the average phase difference across Channel Estimate subcarriers between OFDM symbols. Smoothing may also be applied to the resulting per-OFDM-symbol frequency offset.

Details of the processing performed by the processing blocks will now be described in greater detail, beginning with the channel estimation block 128.

Figure 2:
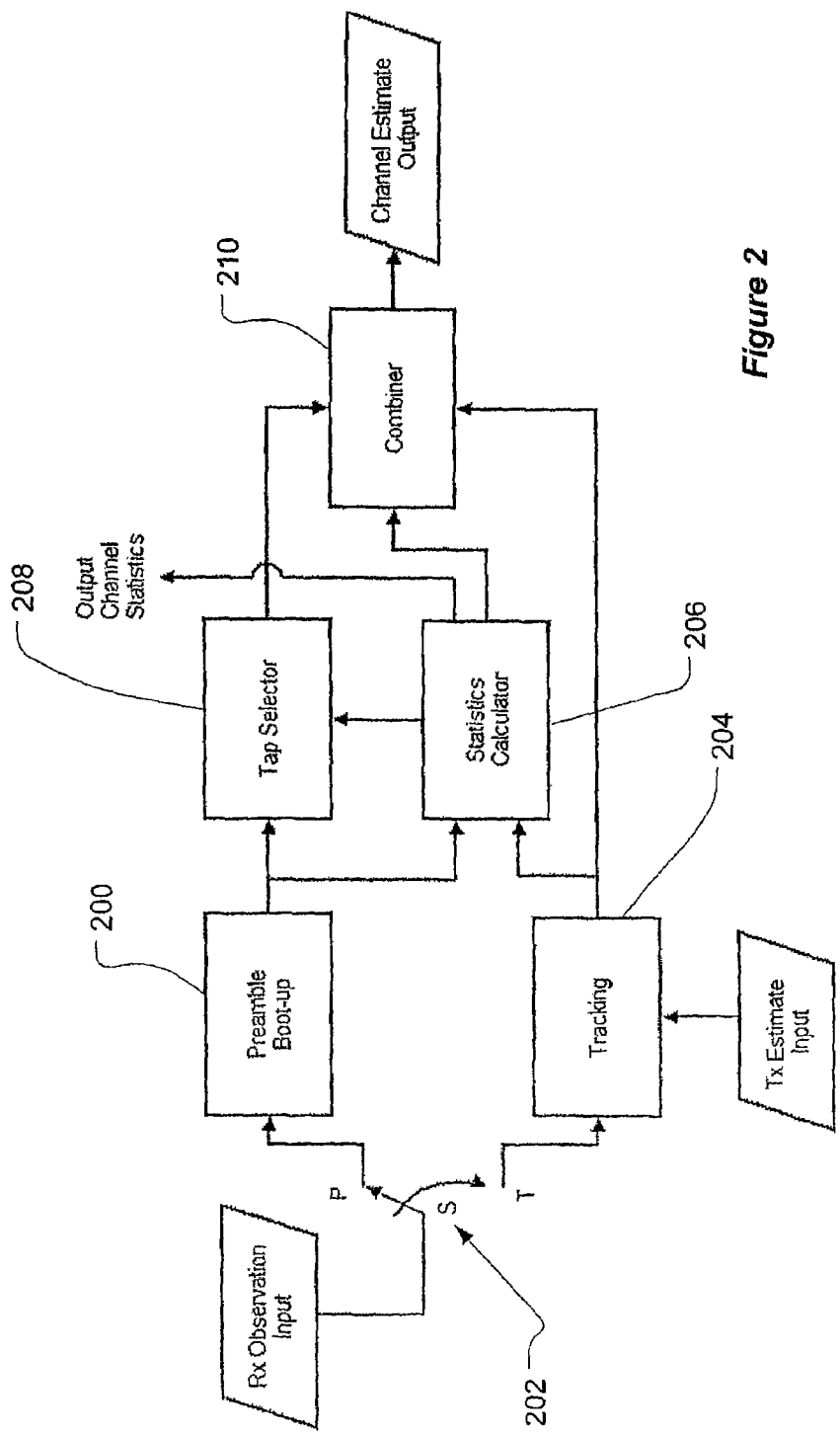
FIG. 2 is a block functional diagram representing a channel estimator of the receiver of FIG. 1.

The channel estimation block 128 operates on the observed time domain signal to generate a complex time-domain estimate of the channel taps. A detailed view of the processing blocks of the channel estimator 128 is illustrated in FIG. 2.

Upon first receipt of an observation in respect of a signal the channel estimator 128 generates an initial channel estimate via a preamble boot-up process. This initial channel estimate is generated in the Preamble boot up block 200. The received time domain signal is directed to the Preamble boot-up block 200 when switch S (202) is in the P position. The boot-up process uses the received observation 106, and knowledge of the packet preamble, to produce an estimate of the complex time-domain channel taps.

Example methods for generating the initial estimate are described in our copending PCT application PCT/AU2007/00231 discussed above and may include:
using a linear filter technique;
using a sliding correlator (matched filter); or
using an Integrated MMSE and Sliding Correlator.

The initial channel estimate generated by the Preamble Boot-up block is provided to the statistics calculator 206 and Tap selector 208 for further processing as will be described below. Additional data may also be provided to one or both of the statistics calculator 206 and Tap selector 208 by the preamble boot up block 200. For example, if a sliding correlator is employed in the preamble boot-up block 200, then the preamble boot-up block may also provide a state of the correlator accumulators.

Upon completion of preamble processing, the switch S, 202, is shifted to the T position and the channel-estimate tracking process, performed by the Tracking block 204, is enabled.

The channel statistics calculator 206 takes a channel estimate from either the preamble boot-up block (200) or channel tracking block 202, as appropriate, and provides one or more of an estimate of the average power, the RMS delay spread, the coherence time, and coherence frequency of the time-domain channel estimate, $\hat{h}_t$. These statistics may be employed during one or more of demodulation, decoding, interference cancellation and signal combining. They may also be used to dynamically control system parameters, e.g. the relative delay between processing streams, as applied by delay block 110.

Results from the statistics calculator may be used by control mechanisms, such as the tap selection process described below, or for diagnostics. If such functions are not required then the block may be omitted to reduce overall implementation complexity.

The tap selector 208 compares the power of each estimated time-domain tap with a threshold value and discards those taps with power below the threshold. The threshold may be some fixed value, or may be some function of the estimate, which is set dynamically as the estimate is updated, e.g. via a lookup table.

Details of the operation of the tap selector are set out in our earlier PCT application PCT/AU2007/000231 discussed above.

Upon completion of preamble processing the switch S, 202, is shifted to the T position and the channel tracker 204 implements a channel estimate tracking process. The channel tracking process and combining process (described below) allow the receiver to operate in the presence of a time-varying channel. The tracker makes use of the received observation 106 and a time domain estimate of the transmitted data for a particular OFDM symbol. The time domain estimate of the transmitted data is generated as a frequency domain estimate by the remodulation block 124 of the second processing stream 102, and is converted to a time domain signal for feeding back to the channel tracker 204 by the Domain converter 136. In some embodiments the remodulation process is identical to that used in the transmit process, including the insertion of guard and pilot tones.

Channel tracking generally occurs as described in our co-pending PCT application PCT/AU2007/000231. As noted therein a selected subset of taps may be tracked, as dictated by the tap selection block, thus reducing implementation complexity.

In another, but non-preferred embodiment, techniques known for estimating the channel in the frequency domain may be employed to track the channel. In this case the domain converter 136 can be omitted from the system.

In another embodiment the channel estimate tracking method may change from one technique to another at some point during reception of a packet. For example, the method may change from a time domain estimation to a frequency domain estimation during packet reception. The change of estimation techniques could occur after elapsing of a fixed time with respect to the start of packet reception, or be determined dynamically by some system state metric, such as a function of the delay spread.

The channel estimate combiner 210 is configured to generate an auto-regressed update of the channel estimate, $\hat{h}_r$, with the new channel estimate from the channel estimate tracker block 204. Two or several states of the channel estimate can be combined with a higher-order auto regression to generate the new channel estimate.

The combiner 210 operates as described in our co-pending PCT application PCT/AU20071000231 and will not be described in detail in this specification.

The output from the time domain channel estimator 128 is then passed to the Domain converter 130 to convert it to a frequency domain signal for, input into the channel predictor 132. The Domain converter 130 operates in substantially the same manner as the Domain Converter (Channel) illustrated in FIG. 8 of our earlier PCT application and described therein, and thus will not be further described.

Each OFDM symbol also undergoes a two stage, or iterative equalisation process. The Channel predictor 132, Post MRC channel parameter generator 134 and MRC 112 and Cancel ISI block 114 notionally form a first equalizer belonging to the first processing stream 102. The Channel predictor 132, Post MRC channel parameter generator 134 and MRC 120 notionally form a second equalizer that belongs to the second processing stream 104. Each received OFDM symbol is processed by the second processing stream 104 first, and this is first processed by the second equalizer for the purpose of generating a frequency domain estimate of the transmitted OFDM symbol. The same OFDM symbol is later processed by the first equalizer using updated channel predictions to generate more accurate metrics which are used for final signal decoding.

It should be noted that due to this iterative processing scheme, the output of the channel predictor 132, for any given OFDM, symbol that is used in processing by the second stream 104 may be different to the output of the channel predictor 132 that is used in processing by the first stream 104. This is due to time offset between the processing performed in the two streams. As an example, take an OFDM symbol that is processed by the second stream at time i. The processing of this symbol will use the most recent channel data available at that time i. However this same OFDM symbol will not be processed by the first stream 102 until two time slots later, i.e. time i+2, due to the 2 time slot delay introduced by block 110. When the OFDM symbol is processed in the first stream 102 the first MRC 112 will use the most recent channel data available at that time, namely the channel data available at time i+2. The channel data available at time i+2 is advantageously generated on the basis of the OFDM symbol being processed and an estimate of the transmitted data in the symbol previously produced by the second processing stream 104.

The second equalizer includes the channel predictor 132, MRC 120 and decoder 122 and remodulation block 124 and generates a set of intermediate receiver data estimates for use in ISI cancellation in the first stream processing and as feedback to the channel estimator 128.

The MRC 120 receives the early (when compared to MRC 112) channel predictions from the channel predictor 132 and the frequency domain sequence of OFDM symbol observations and processes them using some form of signal combining, e.g. MRC or MMSE. The output of the MRC block 120 is input into the decoder 122 to generate initial receiver decisions.

This output is then remodulated using block 124. The nature of the remodulation performed depends on the nature of the FEC decoder block used in the receiver. In the case where the decoder 122 outputs an estimate of the transmitted information bits, the estimated output bits from the decoder are fed into a replica of the encoder and modulator used for transmission, e.g. if a Viterbi Decoder is used which outputs hard information bits. If the decoder outputs soft transmitted bit estimates, e.g. soft bit likelihoods, then a soft modulator that computes the average modulated symbol may be employed in the remodulation block 124.

The first equalizer of the first stream 102 includes the channel predictor 132, MRC 112 and Cancel ISI block 114, Post MRC channel parameter generator 134, and generates accurate decoder input metrics for input into the decoder 116.

These processing blocks may use a variety of techniques in generating decoder, input metrics from the observation sequence using the following observation model for each OFDM symbol which was set out in equation 7 of our earlier PCT patent application PCT/AU2007/000231;

$$Y[i]=R_0[i]X[i]+R_1[i]X[i-1]+n[i].$$

In this equation X is a vector representing L transmitted frequency domain symbols and Y is a vector representing the L multicarrier symbols observed at the receiver. The vector n is additive white Gaussian noise and the bracketed terms indicate the symbol period index. The principal diagonals of $R_0$ and $R_1$ are defined as vectors $h_0$ and $h_1$ respectively. The preferred embodiment considers ISI effects, and does not make use of the non-principal diagonals of $R_0$ and $R_1$. In other embodiments, the Cancel ISI block 114 may be modified to also cancel the effects of ICI, and the band diagonal structure of $R_0$ and $R_1$ may be exploited in order to reduce implementation complexity. The above equation models the case when the channel delay spread is constrained to within one prefixed OFDM symbol period. The model may be generalised to account for channels having longer delay spread, according to $$Y[i] = \sum_j R_j[i]X[i-j] + n[i].$$

Decoder input metrics may be obtained from such an observation sequence using many techniques including:

Trellis based schemes such as APP and Viterbi equalizers e.g. with soft output.

Concatenated linear filtering (e.g. LMMSE, MRC etc) following by soft or hard interference cancellation, or Interference Cancellation followed by linear filtering (e.g. LMMSE).

In a preferred form a two-tap per subcarrier maximum ratio combiner (MRC) is applied for each received OFDM symbol, $$Y_{mrc}[i]=h_0*[i] \circ Y[i]+h_1*[i] \circ Y[i+1]$$

where the resulting observation model at the output of the MRC 112 is $$Y_{mrc}[i] = h_0^*[i] \cdot h_0[i] \cdot X[i] + h_1^*[i+1] \cdot h_1[i+1] \cdot X[i] +$$
$$h_1^*[i+1] \cdot h_0[i] \cdot X[i-1] + h_1^*[i] \cdot h_0[i+1] \cdot X[i+1]$$
$$= \alpha[i] \cdot X[i] + \beta[i] \cdot X[i-1] + \gamma[i] \cdot X[i+1]$$

and the ○ operator represents the element-wise matrix multiply, or Hadamard product. The interference gain components β[i] and γ[i] are readily calculated by post MRC channel parameter generator 134 from the channel estimate sequences {h$_0$[i]} and {h$_1$[i]}.

The cancel ISI block 114, using previously calculated estimates of X[i−1] and X[i+1], from input 126, generated by the remodulation of decoded data from stream 2 104, applies an interference cancellation to each OFDM symbol as follows $$Y_{mrcic}[i]=Y_{mrc}[i]-\beta[i] \circ \hat{X}[i-1]-\gamma[i] \circ \hat{X}[i+1].$$

Next decoder metrics are computed from $Y_{mrcic}[i]$ using a Gaussian distribution model with conditional mean equal to α[i] and estimate of the observation noise power σ$^2$.

In the case of A receive antennas only the combining would require expansion to include all time and antenna diversity available.

$$Y_{mrc}[i] = \sum_{a=1}^{A} h_0^*[i, a] \cdot Y[i, a] + h_1^*[i, a] \cdot Y[i+1, a]$$

With the interference coefficients now being calculated by the parameter generator 134 as follows:

$$\gamma[i] = \sum_{a=1}^{A} h_1^*[i, a] \cdot h_0[i+1, a]$$

$$\beta[i] = \sum_{a=1}^{A} h_1^*[i+1, a] \cdot h_0[i, a].$$

As can be seen from the foregoing description, the decision-feedback structure of the receiver is highly parallel. Channel prediction, both maximal ratio combiners and the interference canceller operate per-subcarrier. The receiver offers low latency due to per-OFDM symbol processing. It is also easily extended to multiple-antenna implementations, via appropriate modification of the maximum ratio combining components to include spatial, as well as temporal combining. Improved performance may be obtained by using soft-in soft-out decoders in comparison to Viterbi decoders, and/or by replacing the interference canceller with a soft interference canceller, and/or by extending the canceller to remove ICI components as described above. It should also be noted that if the receiver is operating in a short delay spread environment, stream 1, 102 can be switched off. In this case, stream 2, 104 will provide performance similar to a standard receiver. Alternatively, additional processing streams may be added to the system, each of which can be provided with an independent delay block and associated delay period. The number of streams used may be selected dynamically according to one or more system state metrics.

Figure 3:
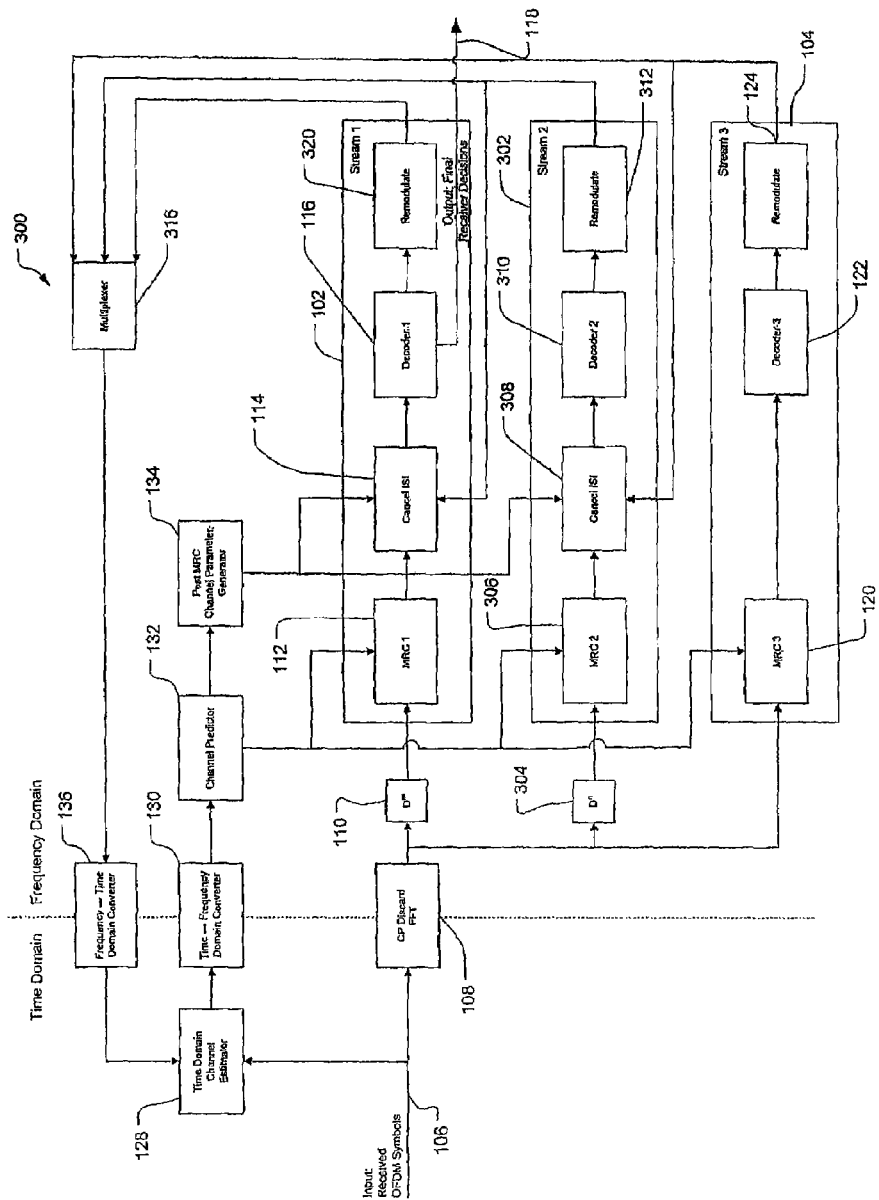
FIG. 3 is a schematic illustration of a receiver operating in accordance with a second embodiment of the present invention.

FIG. 3 illustrates an embodiment in which three processing streams are used. As with the example of FIG. 1, the system of FIG. 3 performs processing per OFDM symbol. In the receiver 300 of FIG. 3 there are three parallel data-processing streams. Data processing streams 1 (102) and 3 (104) of FIG. 3 are essentially the same as data processing stream 1 (102) and stream 2 (104) respectively, of FIG. 1. Accordingly their components have been correspondingly numbered. The receiver of FIG. 3 additionally includes a third data processing stream, stream 2, 302.

In this example Stream 1, 102 produces the final receiver decisions and operates at a delay m with respect to stream 3 104. Stream 2 302 operates at a delay n with respect to stream 3 104 and assists stream 1 102 with interference cancellation and channel estimation, by providing "intermediate" decoder outcomes for training. Stream 2 also performs interference cancelling to improve the quality of the decoder outcomes provided to stream 1 104. Stream 3 302 assists stream 2 104 with its interference cancellation and channel estimation, by providing "early" decoder outcomes for training.

In the present embodiment a different delay (with respect to the time of processing of an observed symbol in the third stream 104) is used for the processing of an observed symbol in each of the first 102 and second processing streams. The delays may be fixed or set dynamically on the basis of one or more system state parameters.

As with the previous embodiment, the processing of a received OFDM symbol begins with cyclic prefix removal and conversion to the frequency domain in CP discard and FFT block 108. As noted above stream 1, operates with a m symbol delay with respect to stream 3 104 and stream 2 302 a n symbol delay with respect to stream 3 104 hence the system 300 includes two delay blocks, block 110 (for applying a m symbol delay for stream 1 104) and block 304 (for applying a n symbol delay for stream 2 302).

Processing in Stream 1, 102 is generally similar to the previous embodiment, with the exception that in the system of FIG. 3 it additionally includes a remodulation block 320. The remodulation block is similar to the block 124 used in stream 3 and generates a set of receiver data estimates for use as feedback to the channel estimator 128.

Stream 2 302 is used to generate receiver data estimates for use in error cancellation in stream 1, 302, and in channel estimation. Stream 2, 302 includes a maximum ratio combiner 306, an ISI cancellation block 308 operating in a similar manner to the block 114, described in relation to the first embodiment. The error-cancelled output of the MRC block 306 is input to decoder 310 to calculate initial information bit estimates which are then remodulated in block 312 for output to the next processing stream, for use in error cancellation. The transmitted symbol estimates generated by the remodulation block 312 are also output to the multiplexer 316.

Stream 3 104 is used to generate receiver data estimates for use in error cancellation in stream 2, 302, and in channel estimation. Stream 3, 104 includes a maximum ratio combiner 120 driving a decoder 122 to calculate initial information bit estimates.

The receiver 300 also includes a multiplexer 316 that is used to combine outputs of the three remodulation blocks 320, 312 and 124 and to provide the multiplexed output to the Domain Converter 136 for input into the channel estimator 128. The multiplexer 316 effectively has the task of queuing the transmitted signal estimates from the remodulators 320, 312 and 124 for input into the Domain converter. In an alternative embodiment a plurality of parallel domain converters 136 could be employed to handle the transmitted signal estimates from the remodulators 320, 312 and 124.

The channel estimator 128 also differs from the previous embodiment, in so far as it now receives several transmitted symbol estimates relating to each data symbol from which it can produce a channel estimate. The received estimates may be generated sequentially or in parallel. If they are created in parallel then means for combining two or more "equivalent" received estimates can be included in the system.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A data processing device forming part of a receiver for a multicarrier communications system in which a sequence of symbols is transmitted on a plurality of subcarriers over a communication channel, the data processing device including:
   a channel prediction element configured to receive an observed symbol and a feedback signal representing an estimate of at least one transmitted symbol in respect of at least one previously processed data symbol and to generate a channel prediction;
   an initial processing element configured to process the observed symbol on the basis of the channel prediction as calculated at a first time by the channel prediction element and to output the feedback signal for feed back into the channel prediction element; and
   a subsequent processing element configured to process a controllably delayed version of the observed symbol on the basis of the channel prediction as calculated at a second time by the channel prediction element at least partly on the basis of the feedback signal output from the initial processing element in respect of the observed symbol, to generate an information bit estimate for the observed symbol,
   wherein either or both of the initial processing element and the subsequent processing element comprise a soft-input decoder.

2. A data processing device forming part of a receiver for a multicarrier communications system as claimed in claim 1 wherein the channel prediction element includes a time domain channel estimator.

3. A data processing device forming part of a receiver for a multicarrier communications system as claimed in claim 2 which further includes at least one domain converter to convert at least one of an input and output of the channel estimator between the time and frequency domains.

4. A data processing device forming part of a receiver for a multicarrier communications system as claimed in claim 1 wherein the channel prediction element includes a frequency domain channel predictor.

5. A data processing device forming part of a receiver for a multicarrier communications system as claimed in claim 1 wherein the initial processing element includes a remodulator configured to remodulate an initial information bit estimate corresponding to an observed symbol for use as the feedback signal.

6. A data processing device forming part of a receiver for a multicarrier communications system as claimed in claim 1 which further includes an interference cancellation element in the subsequent processing element.

7. A receiver for a multicarrier communications system including a processing device as claimed in claim 1.

8. A data processing device forming part of a receiver for a multicarrier communications system as claimed in claim 1 wherein the receiver includes multiple antennas for receiving the transmitted symbol.

9. A data processing device forming part of a receiver for a multicarrier communications system as claimed in claim 8 wherein the multiple antennas are spatially separated.

10. A data processing device forming part of a receiver for a multicarrier communications system as claimed in claim 1 wherein the soft-input decoder is configured to receive a-priori probabilities or log-likelihood ratios.

11. A data processing device forming part of a receiver for a multicarrier communications system as claimed in claim 1 wherein the controllably delayed version of the observed symbol is delayed by an integer multiple of a period of the sequence of symbols.

12. A data processing device forming part of a receiver for a multicarrier communications system in which a sequence of symbols is transmitted on a plurality of subcarriers over a communication channel, the data processing device including:
   a channel prediction element configured to receive an observed symbol and at least one feedback signal representing an estimate of at least one transmitted symbol and to generate a channel prediction;
   at least one initial processing element configured to process the observed symbol on the basis of the channel prediction as calculated at a respective time by the channel prediction element and to output a feedback signal representing an estimate of a transmitted symbol corresponding to the observed symbol for feed back into the channel prediction element; and
   a subsequent processing element configured to process a controllably delayed version of the observed symbol on the basis of the channel prediction as calculated at a second time by the channel prediction element at least partly on the basis of the feedback signal output from the at least one initial processing element in respect of the observed symbol, to generate an information bit estimate corresponding to the observed symbol,
   wherein any one or more of the at least one initial processing element and the subsequent processing element comprise a soft-input decoder.

13. A data processing device forming part of a receiver for a multicarrier communications system as claimed in claim 12 wherein the device includes a plurality of initial processing elements.

14. A data processing device forming part of a receiver for a multicarrier communications system as claimed in claim 13 wherein the plurality of initial processing elements are configured to successively process the observed symbol on the basis of a channel prediction calculated at a different respective time.

15. A data processing device forming part of a receiver for a multicarrier communications system as claimed in claim 13 wherein the second time is controllably delayed with respect to the respective time corresponding to each initial processing element.

16. A data processing device forming part of a receiver for a multicarrier communications system as claimed in claim 15 wherein the respective time corresponding to at least one initial processing element is dynamically allocated.

17. A data processing device forming part of a receiver for a multicarrier communications system as claimed in claim 12 which includes a plurality of initial processing elements, and wherein the device is further configured to selectively bypass at least one processing element.

18. A data processing device forming part of a receiver for a multicarrier communications system as claimed in claim 12 which further includes a multiplexer to multiplex an output signal representing an estimate of a transmitted symbol in respect of the observed symbol from a plurality of processing elements.

19. A data processing device forming part of a receiver for a multicarrier communications system as claimed in claim 12 wherein the subsequent processing element is further configured to output a signal representing an estimate of a transmitted symbol in respect of the observed symbol for feed back into the channel prediction element.

20. A data processing device forming part of a receiver for a multicarrier communications system as claimed in claim 12 wherein the channel prediction element is configured to receive a plurality of feedback signals each representing an estimate of the transmitted symbol in respect of the same data symbol.

21. A data processing device forming part of a receiver for a multicarrier communications system as claimed in claim 20 wherein the plurality of feedback signals input into the channel prediction element are multiplexed.

22. A data processing device forming part of a receiver for a multicarrier communications system as claimed in claim 12 wherein the soft-input decoder is configured to receive a-priori probabilities or log-likelihood ratios.

23. A data processing device forming part of a receiver for a multicarrier communications system as claimed in claim 12 wherein the controllably delayed version of the observed symbol is delayed by an integer multiple of a period of the sequence of symbols.

24. A method of processing at least one observed symbol in a receiver for a multicarrier communications system in which a sequence of symbols is transmitted on a plurality of subcarriers over a communication channel, the method including:
(a) processing an observed symbol to generate a channel prediction;
(b) generating at least one initial transmitted symbol estimate in respect of the observed symbol based on the observed symbol and the channel prediction;
(c) generating an updated channel prediction at least partially on the basis of the at least one initial transmitted symbol estimate in respect of the observed symbol;
(d) generating an information bit estimate on the basis of a controllably delayed version of the observed symbol and the updated channel prediction,
wherein either or both steps (b) and (d) includes soft decision decoding of the symbols.

25. A method of processing at least one observed symbol as claimed in claim 24 wherein at least one of steps (a) and (c) includes the step of:
(e) generating a time domain channel estimate from the observed symbol.

26. A method of processing at least one observed symbol as claimed in claim 25 wherein at least steps (b) and (d) are performed in the frequency domain.

27. A method of processing at least one observed symbol as claimed in claim 24 wherein step (d) includes the step of:
(f) performing error correction processing on the observed symbol.

28. A method of processing at least one observed symbol as claimed in claim 24 wherein step (b) includes,
(g) decoding the observed symbol to form an initial information bit estimate; and
(h) remodulating the initial information bit estimate to generate a transmitted symbol estimate.

29. A method of processing at least one observed symbol as claimed in claim 28 which further includes the step of using the transmitted symbol estimate in step (c).

30. A method of processing at least one observed symbol as claimed in claim 24 wherein at least one of steps (a) and (c) are performed in accordance with the process comprising:
generating a time domain channel estimate from at least a portion of an observed signal;
converting the time domain channel estimate to a frequency domain channel estimate; and
generating one or more channel predictions using the frequency domain channel estimate.

31. A method of processing at least one observed symbol as claimed in claim 24 wherein step (a) includes:
using a sliding correlator to generate a channel estimate in respect of an observed symbol.

32. A method of processing at least one observed symbol as claimed in claim 31 which further includes transmitting at least one parameter of the sliding correlator for use in generating a channel estimate in respect of an observed symbol.

33. A method of processing at least one observed symbol as claimed in claim 24 wherein the method includes generating a first channel prediction on the basis of received channel estimate.

34. A method of processing at least one observed symbol as claimed in claim 33 wherein received channel estimate is derived from at least one of:
a channel estimate relating to a previously observed symbol; or
a channel estimate relating to a previously received data packet.

35. A method as claimed in claim 24 wherein said soft decision decoding includes receiving a-priori probabilities or log-likelihood ratios.

36. A method of processing at least one observed symbol as claimed in claim 24 wherein the controllably delayed version of the observed symbol is delayed by an integer multiple of a period of the sequence of symbols.

37. A non-transitory computer program product comprising machine-readable program code recorded on a machine-readable medium, for controlling the operation of a receiver for a multicarrier communications system on which the program code executes to process a plurality of observed symbols, the computer program product comprising:
code for a channel prediction element configured to receive an observed symbol and a feedback signal representing an estimate of at least one transmitted symbol in respect of at least one previously processed data symbol and to generate a channel prediction;
code for at least one initial processing element configured to process the observed symbol on the basis of a channel prediction calculated at a respective time by the channel prediction element and to output a signal representing an estimate of a transmitted symbol corresponding to the observed symbol for feedback into the channel prediction element; and code for a subsequent processing element configured to process a controllably delayed version of the observed symbol on the basis of a channel prediction calculated at a second time by the channel prediction element at least partly on the basis of an output of the at least one initial processing element in respect of the observed symbol, to generate an information bit estimate for the observed symbol, wherein any one or more of the at least one initial processing element and the subsequent processing element comprise a soft-input decoder.

38. A non-transitory computer program product as claimed in claim 37 wherein the soft-input decoder is configured to receive a-priori probabilities or log-likelihood ratios.

39. A non-transitory computer program product as claimed in claim 37 wherein the controllably delayed version of the observed symbol is delayed by an integer multiple of a period of the sequence of symbols.

* * * * *

UNITED STATES PATENT AND TRADEMARK OFFICE
CERTIFICATE OF CORRECTION

PATENT NO. : 8,767,844 B2
APPLICATION NO. : 12/302134
DATED : July 1, 2014
INVENTOR(S) : Alexander et al.

It is certified that error appears in the above-identified patent and that said Letters Patent is hereby corrected as shown below:

In the Specification

Column 6, line 38, delete "202" and insert --204--, therefor

Column 7, line 34, delete "PCT/AU20071000231" and insert --PCT/AU2007/000231--, therefor Column 7, line 38, after "for", delete --,--, therefor Column 7, line 63, delete "104" and insert --102--, therefor Column 8, line 39, after "decoder", delete --,--, therefor Column 9, line 13-18, delete "
$$Y_{mrc}[i] = h_0^*[i] \cdot h_0[i] \cdot X[i] + h_1^*[i+1] \cdot h_1[i+1] \cdot X[i] +$$
$$h_1^*[i+1] \cdot h_0[i] \cdot X[i-1] + h_1^*[i] \cdot h_0[i+1] \cdot X[i+1]$$
$$= \alpha[i] \cdot X[i] + \beta[i] \cdot X[i-1] + \gamma[i] \cdot X[i+1]$$
"

and insert --
$$Y_{mrc}[i] =$$
$$h_0^*[i] \circ h_0[i] \circ X[i] +$$
$$h_1^*[i+1] \circ h_1[i+1] \circ X[i] +$$
$$h_1^*[i+1] \circ h_0[i] \circ X[i-1] +$$
$$h_1^*[i] \circ h_0[i+1] \circ X[i+1]$$
$$= \alpha[i] \circ X[i] + \beta[i] \circ X[i-1] + \gamma[i] \circ X[i+1]$$
--, therefor Column 9, line 40-41, delete "
$$Y_{mrc}[i] = \sum_{a=1}^{A} h_0^*[i, a] \cdot Y[i, a] + h_1^*[i, a] \cdot Y[i+1, a]$$
"

Signed and Sealed this
Eleventh Day of November, 2014

Michelle K. Lee
*Deputy Director of the United States Patent and Trademark Office*

CERTIFICATE OF CORRECTION (continued)
U.S. Pat. No. 8,767,844 B2 and insert --
$$Y_{mrc}[i] = \sum_{a=1}^{A} h_0^*[i,a] \circ Y[i,a] + h_1^*[i,a] \circ Y[i+1,a]$$
--, therefor Column 9, line 47-53, delete "
$$\gamma[i] = \sum_{a=1}^{A} h_1^*[i,a] \cdot h_0[i+1,a]$$
$$\beta[i] = \sum_{a=1}^{A} h_1^*[i+1,a] \cdot h_0[i,a].$$
"

and insert --
$$\gamma[i] = \sum_{a=1}^{A} h_1^*[i,a] \circ h_0[i+1,a]$$
$$\beta[i] = \sum_{a=1}^{A} h_1^*[i+1,a] \circ h_0[i,a].$$
--, therefor Column 10, line 26, delete "104" and insert --102--, therefor Column 10, line 26, delete "302" and insert --104--, therefor Column 10, line 26, delete "104" and insert --302--, therefor Column 10, line 42, delete "104" and insert --102--, therefor Column 10, line 51, delete "302" and insert --102--, therefor

UNITED STATES PATENT AND TRADEMARK OFFICE
CERTIFICATE OF CORRECTION

| | | |
|---|---|---|
| PATENT NO. | : 8,767,844 B2 | Page 1 of 1 |
| APPLICATION NO. | : 12/302134 | |
| DATED | : July 1, 2014 | |
| INVENTOR(S) | : Alexander et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1086 days.

Signed and Sealed this
Twenty-fifth Day of August, 2015

Michelle K. Lee
*Director of the United States Patent and Trademark Office*